Jan. 5, 1971    H. A. SANDERS ET AL    3,552,853

HOLOGRAMIC IDENTIFICATION SYSTEM

Filed July 1, 1968

INVENTORS
HAROLD A. SANDERS
GROVER W. TRYTTEN

BY Hauke, Krass, Gifford, & Pataledis

ATTORNEYS

United States Patent Office 3,552,853
Patented Jan. 5, 1971

3,552,853
HOLOGRAMIC IDENTIFICATION SYSTEM
Harold A. Sanders, Huntington Woods, and Grover W. Trytten, Ann Arbor, Mich., assignors to Chain Lakes Research Associates, Inc., Detroit, Mich., a corporation of Michigan
Filed July 1, 1968, Ser. No. 741,489
Int. Cl. A44c 3/00; G03b
U.S. Cl. 355—133       6 Claims

ABSTRACT OF THE DISCLOSURE

A system for identifying goods and the like consisting in making an original reflection hologram of a plurality of information data relative to such goods, dividing the hologram into a plurality of elementary chips each including the totality of the information recorded in the original hologram and attaching one chip, by adhesive or the like, to each article of the goods. The information recorded in the chip is illegible and can be reconstructed only by means of an appropriate viewer decoder.

BACKGROUND OF THE INVENTION

The invention belongs to the field of goods identification by means of tags, labels, or the like for the purpose of inspection, inventory, sales control, theft control and the like. Goods in warehouses and retail stores are generally identified by means of tags and/or labels bearing some type of information in legible or coded form as, for example, model number, stock number, color, size, etc. In addition, the tag often carries information as to retail price and is used as sale inventory control at the moment of sale of the goods and/or during stocking of the goods. Such conventional tags or labels are easily detached from the merchandise, accidentally or purposely, they may become mutilated or illegible, and are often of a large size but carrying only a small amount of information.

The present invention contemplates replacing such labels or tags by minute chips, each in the form of an elementary hologram, providing a substantial amount of information on a small area, which can not be easily altered or mutilated, which furthermore affords substantial safeguards against theft and palming off of altered merchandise, and which lend themselves to automatic merchandising and vending.

The present invention may be used as a replacement for conventional tagging and labeling systems, or, alternately, it may be used in addition to such conventional systems for permanently attaching to the goods some identification mark indicating, for example, the origin of the goods, the name and location of the store where placed on sale, etc.

SUMMARY OF THE INVENTION

The invention contemplates accomplishing the purposes enumerated hereinbefore by recording a reflection hologram including a two- or three- dimensional representation of a plurality of information data relative to a predetermined class of goods, dividing the original hologram into a plurality of small chips, each of which, as a result of a well known quality of holograms, includes the totality of the information recorded on the original hologram, providing the chip with means for attaching to a piece of goods, such as providing a surface thereof with an adhesive, and attaching the chip to each piece of goods. The chip may be attached in a conspicuous location, but preferably, it is attached in a permanent manner in a non-conspicuous location such as to provide permanent identification of the goods during the entire life of each article of goods. The information recorded on the chip is illegible to the naked eye, but may be reconstructed by means of a simple viewer.

The many objects and advantages of the present invention will become apparent to those skilled in the art when the following description of a few examples of the best modes contemplated for practicing the invention is considered in conjunction with the accompanying drawings wherein like numerals refer to like or equivalent parts and in which:

DESCRIPTION OF THE PREFERRED EMBODIMENTS

Figure 1:
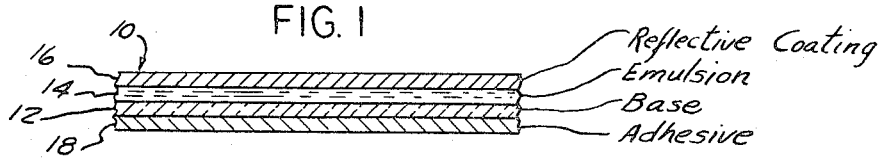
FIG. 1 is a schematic sectional view of an example of identification chip according to the present invention.

In order to practice the present invention, a hologram is made in a conventional manner, such hologram recording in a photographic emulsion a wavefront interference pattern between a reference beam of monochromatic light and the light scattered by an object such object being in the form of a predetermined set of information data of any nature whatsoever, in a two-dimensional form as well as in a three-dimensional form. The information data may relate to merchandise identification data, origin of the merchandise, pricing information, inventory information, and the like. It is a well known quality of holograms that the totality of the information recorded in a hologram is included in any small portion of such hologram. In other words, an original hologram may be divided into a plurality of much smaller portions which each are capable of providing a complete reconstructed image under illumination by a reconstructing beam of light, the only effect of dividing the hologram in smaller portions being that there is a slight loss of definition of the information as reconstructed from a portion, although such information is complete as compared to the information recorded in the original hologram.

Information may be recorded in the original hologram by making successive or consecutive exposures of the hologram photographic film or plate, for example by changing the wavelength of the reference beam from one exposure to the next, by changing the angle of incidence of the reference beam from one exposure to the next, or by rotating the angle of polarization of the incidence beam from one exposure to the next. In this manner, the original hologram may have recorded therein a considerable amount of information, of several order of magnitude greater than any amount of information capable of being recorded by more conventional means.

In order to practice the invention, an original hologram of the information data is recorded in the emulsion of a photographic film. Preferably the exposure of the original hologram is made by causing the reference beam to impinge on one side of the film, while the beam reflected from the object is caused to impinge on the opposite side of the film, according to the technique described by G. W. Stroke and A. E. Labeyrie (Physics Letter, vol. 20, No. 4, Mar. 1, 1966, page 368–370). Such technique of recording the hologram permits reconstruction by white light illumination of the hologram.

The photographic film is processed and a reflective coating is placed on the emulsion of the film, such reflective coating being applied for example by conventional vapor deposition methods or electroless plating of a metal such as aluminum, silver, or the like. The reflective coating provides a facsimile of the silver grain arrangement in the processed emulsion, and the resulting hologram is a reflection hologram.

The original hologram is divided into a plurality of small portions or chips which may be as small as square chips having a side of a few millimeters or even as small as one square millimeter, and which each contain the totality of the information recorded in the original hologram.

Figure 2:
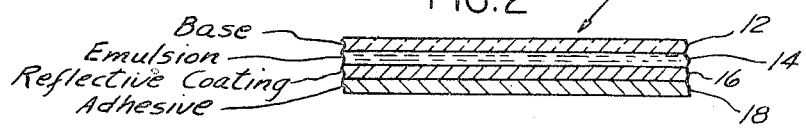
FIG. 2 is a view similar to FIG. 1 but showing a modification thereof.

Referring now to the drawings, and more particularly to FIG. 1 thereof, each individual portion of the original reflection hologram forms a chip, shown generally at 10, consisting of a transparent base 12 having a photographic emulsion 14 on one side thereof, the emulsion having recorded therein a wavefront interference pattern resulting from the wavefront interference between the original reference beam and the beam scattered by the object, such object being the set of information data sought to be recorded. The reflective coating 16 is disposed on the surface of the emulsion, and the surface of the base 12 is coated with an adhesive, as shown at 18, for providing a means of attaching the chip 10 to an article or piece of goods. Alternately, as shown in FIG. 2, the adhesive coating 18 may be placed on the surface of the reflective coating 16, although such a structure requires that the reconstruction beam impinge upon the base side, which requires the use of a monochromatic light reconstruction beam for illumination of the chip for reconstruction of the information.

Figure 3:
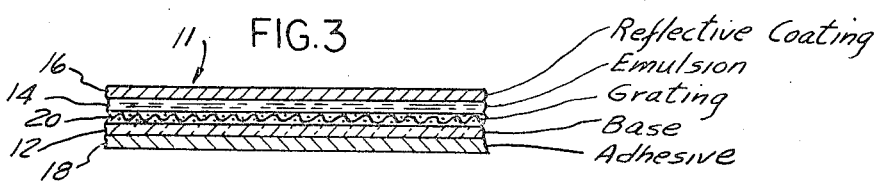
FIG. 3 is a view similar to FIGS. 1 and 2, but showing a further modification.

FIG. 3 represents a further modification of an identification chip 11 substantially alike the chip 10 of FIG. 1, but provided with a grating pattern 20 which, as shown, is a diffraction grating formed on the base surface on the emulsion side. Such diffraction grating is of a predetermined pattern so as to provide a further set of information data, if so desired. It is obvious that the diffraction grating 20 may be alternately obtained by photographic means, in which case it will be included in the emulsion itself.

Figure 4:
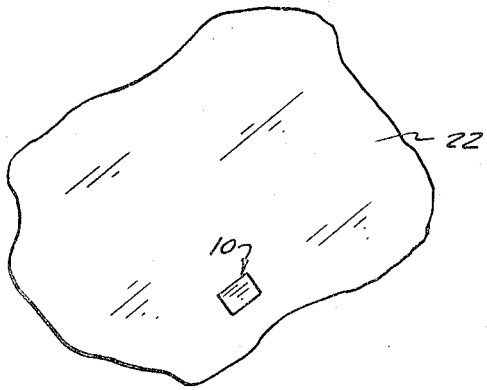
FIG. 4 is a schematic representation of an identification chip according to the present invention attached to a piece of goods.

The identification chip 10 (FIGS. 1 and 2) or 11 (FIG. 3) is attached to a piece of goods, as schematically represented at 22 in FIG. 4, in any convenient location by any appropriate means, such as by the preferred adhesive coating means previously described. In view of the small size of the identification chip 10 or 11, it may be made a part of a conventional identification tag or label, or if so preferred, it may be used in addition to such conventional tag or label or instead thereof. Additionally, for certain purposes such as theft control in retail stores, or control of merchandise returned for exchange or refund, or for the purpose of permanent identification of the goods, the identification chip may be attached to a non-conspicuous location such as, for example, in the seam of a garment, behind a panel in an appliance, etc.

Figure 5:
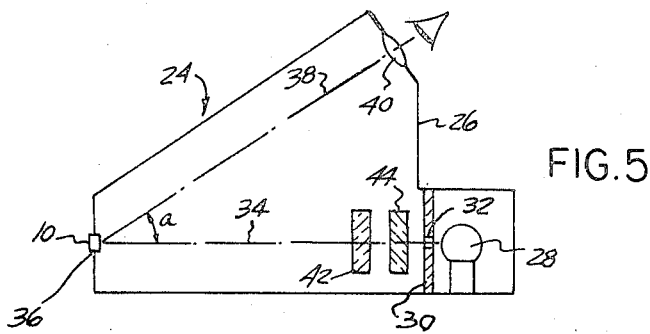
FIG. 5 is a schematic representation of an example of a viewer for reconstructing the information recorded on an identification chip according to the present invention.

The wavefront interference pattern or patterns in the chip, accompanied or not by a diffraction grating, is of course undecipherable except by way of some decoding means permitting reconstruction of the information recorded so as to furnish a legible display thereof. Such a decoding is provided, for example, by a viewer as shown schematically at 24 in FIG. 5 which basically consists of an enclosure 26 in which is placed a light source 28 for providing a reconstruction beam of light 34 by means of a beam forming means such as a mask 30 having a pin hole 32. The beam of light 34 is caused to impinge upon the chip 10 appropriately disposed in the path of the beam in a window 36. The reconstructed image is viewed under axis 38 forming a predetermined angle $a$ by way of a viewing lens 40 providing visual observation of the reconstructed image of the original information. If so desired, a photograph of the reconstructed image may be taken. A filter 42 may be disposed in the path of the light beam 34 where a monochromatic reconstruction beam is required, and a polarizer 44 may be similarly alternately or conjointly disposed in the path of the light beam to provide the reconstruction beam with the same characteristics as the original reference beam used to record the hologram. Angle $a$ between the axis of the reconstruction beam and the viewing axis 38 is of necessity dependent from the angle of incidence of the reference beam used to record the hologram. It is obvious that the viewer 24 may be made in such manner that the diverse filters or polarizers may be independently introduced into the reconstruction light beam path and that the angle $a$ may be made adjustable with precision. Means are provided dependent from window 36 to insure proper angular orienation of the identification chip 10 relatively to the axis of the reconstruction beam 34.

Having thus described the invention by way of a few examples thereof, modification whereof will be obvious to those skilled in the art, what is sought to be protected by United States Letters Patent is as follows:

What is claimed is:

1. A method for identifying goods comprising making a reflection hologram of a plurality of information data relative to said goods, dividing said hologram into a plurality of elementary small chips each including the totality of information data recorded on said hologram and attaching one of said chip to each one of said goods.

2. The method of claim 1 wherein said hologram is made with a reference beam of a predetermined wavelength, polarization and angle of incidence.

3. The method of claim 2 further comprising reconstructing said information data by illuminating any one of said chips with a reconstruction beam of said predeterminded wavelength, polarization and angle of incidence and visually observing said reconstructed information data.

4. The method of claim 1 wherein said reflection hologram is made by recording a hologram of said information data followed by coating the emulsion side of said hologram with a reflective coating.

5. The method of claim 1 further comprising coating each of said chips with an adhesive for attaching to each one of said goods.

6. The method of claim 1 further comprising recording an optical diffraction grating in said hologram for additional information data.

References Cited

"Photography by Laser," E. M. Leith and J. Upartnicks, page 31, Scientific American, June 1965, volume 212, No. 6.

JOHN M. HORAN, Primary Examiner

D. J. CLEMENT, Assistant Examiner

U.S. Cl. X.R.

350—3,5; 283—18, 1; 40—2